United States Patent [19]
Sugimura et al.

[11] 3,948,287
[45] Apr. 6, 1976

[54] ACCUMULATOR

[76] Inventors: Nobuyuki Sugimura; Kazuo Sugimura, both of 1416 Sodeshi-cho, Shimizu, Shizuoka, Japan

[22] Filed: Apr. 12, 1974

[21] Appl. No.: 460,349

[52] U.S. Cl. ............................................. 138/30
[51] Int. Cl.² ........................................ F16L 55/04
[58] Field of Search ................................. 138/30

[56] References Cited
UNITED STATES PATENTS

| | | | |
|---|---|---|---|
| 3,137,317 | 6/1964 | Peters | 138/30 |
| 3,197,087 | 7/1965 | Black | 138/30 |
| 3,674,054 | 7/1972 | Mercier | 138/30 |

*Primary Examiner*—Richard E. Aegerter
*Assistant Examiner*—Steven L. Stephan
*Attorney, Agent, or Firm*—Hofgren, Wegner, Allen, Stellman & McCord

[57] ABSTRACT

Accumulator consisting of a container body and a lid body. In assembling, first the open portion of the bladder is attached to the open portion of the lid. Thereafter, the joint portions of the lid body and container body are welded. A guide ring connected to a bladder holding ring is placed at the inner face of the joint portion of the lid body and container main body, said guide ring is then bonded to the lid body and the bladder holding ring is applied to the bladder. With the bladder holding ring and container main body, the flange portion of the bladder is pressed against the inner wall of the container.

2 Claims, 6 Drawing Figures

ACCUMULATOR

This invention relates to an improvement of accumulator in which pressure liquid is accumulated and the abrupt pressure variation of such liquid is dampened. More to be particular, while such accumulator consists of an outside pressure container and a therein contained bladder of elastic material, the present invention is contemplated an improved construction for positioning the bladder correctly in the pressure container.

One object of the present invention is such that when the bladder is mounted in the pressure container the bladder is placed correctly in a predetermined position with easy working.

Another object of the present invention is such that when the bladder is deformed, its contact portion is eased smoothly so that the bladder will not be locally injured.

Further object of the present invention is such that in the pressure container consisted of a lid body and a main body, when the bladder is mounted in the pressure container, it enables to place the bladder into the main body as in the state that the bladder is attached to the lid body.

Still another object of the present invention is such that the upper opening rim of the bladder is resiliently closed to the inner wall of the container main body.

Still further object of the present invention is such that when the lid body and the container main body are welded, any residue caused by the welding is barred to enter into the pressure container.

In the accumulator of the present invention consisting of a pressure container filled with liquid and a therein housed bladder filled with gas, its construction is such that the pressure container is a jointed structure of a lid body and a main body, and in the first, the lower inside of the lid body is housed with the upper circumferential portion of the guide ring, then the outer circumference of the bladder holding ring is let engaged to the inside of the opening portion of the bladder, said inside opening portion of the bladder being formed of a flange protruding inwardly, this portion is pressed between said circumference of the bladder holding ring and the inner wall of the main body. The lower end of the bladder holding ring is formed a curl directed inwardly.

The objects and construction of the accumulator of the present invention will become more apparent as description proceeds with reference to accompanying drawings in which.

Figure 1:
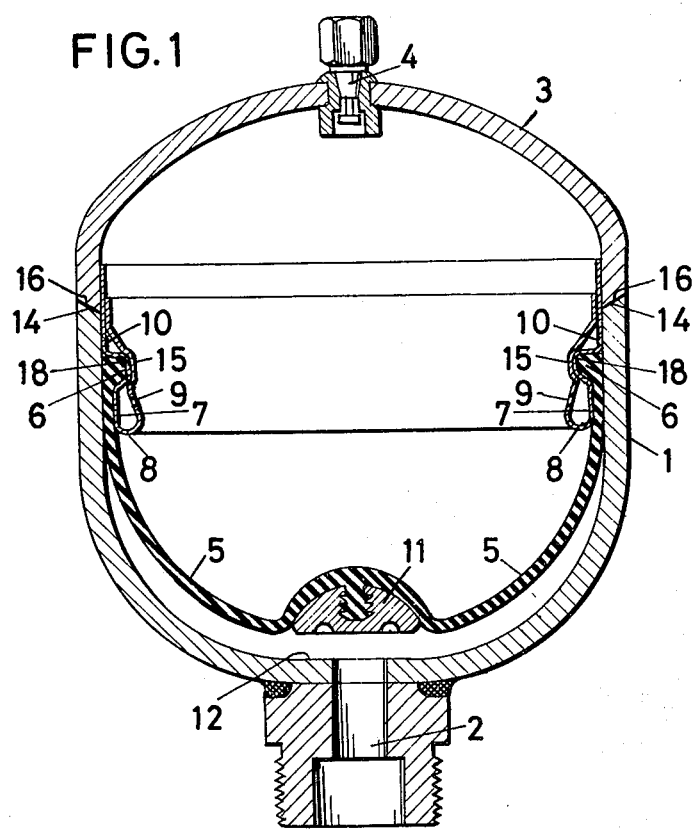
FIG. 1 is a longitudinal sectional view of a first embodiment of the present invention.

In FIG. 1, numeral 1 designates a cup shape container body made of suitable metal material to be resistible to operation pressure. At its bottom center is provided a liquid port 2. 3 is a lid body having a gas inlet valve 4 at its ceiling. The container body 1 has circumferentially a leveled face 14 at its upper end to be suitable for electron beam welding to mate with a beveled face 16 of the lower end of the lid 3. Those shown in FIGS. 2 and 3, there is formed a welding groove 17 at the joint of the lid 3 and container body 1 and this portion is gas welded or electron-beam welded. 5 is a deformable bladder made of natural or synthetic rubber and at its open end, a flange 6 protrudes inwardly serving as packing. 7 is a bladder holding ring to hold the flange 6 of bladder 5 securely. The lower port of this ring 7 is formed of a curl edge 8 to serve when the bladder turns upward to allow its bending without difficulty. This curl edge 8 has an aperture 9 to let gas in its inside. 10 is a guide ring extending upward from the bladder holding ring 7 along the inner wall of the container body 1, the tip of which is welded to the lower portion of inner periphery of the bladder 3, whereby when the container 1 and lid 3 are assembled, this ring 10 acts as a seal and aligns the main body 1 and lid 3 exactly, thus the lid 3 and container are temporarily connected. Also when the main body 1 and lid 3 are welded, it acts as a back metal. 11 is a valve provided at the bottom of the elastic bladder 5, when the bladder expands, it contacts the valve seat 12 to close the liquid port 2 and when the bladder contracts, it gets away from the valve seat 12 to open the liquid port 2.

Figure 2:
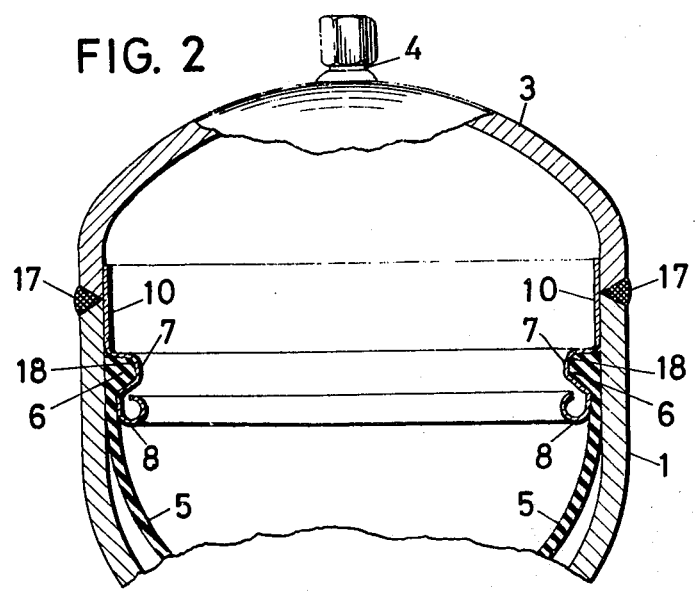
FIGS. 2, 3, 4, 5 and 6 are same views of second, third, fourth, fifth and six embodiments respectively.
Figure 3:
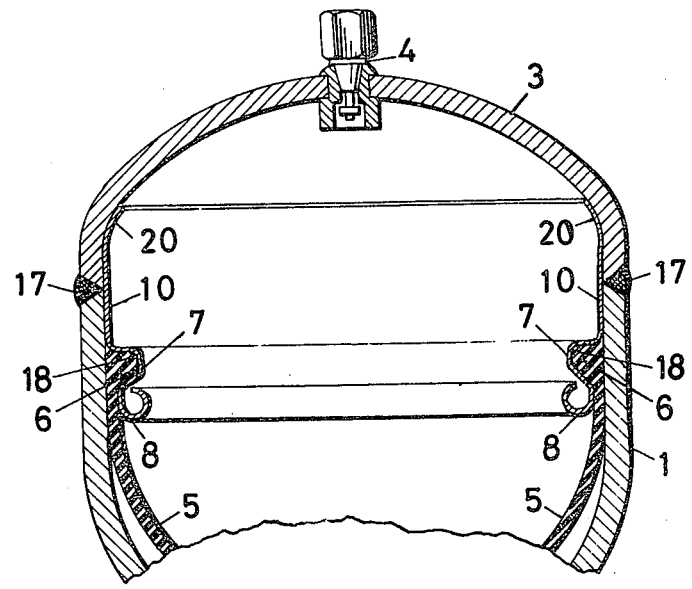
Figure 4:
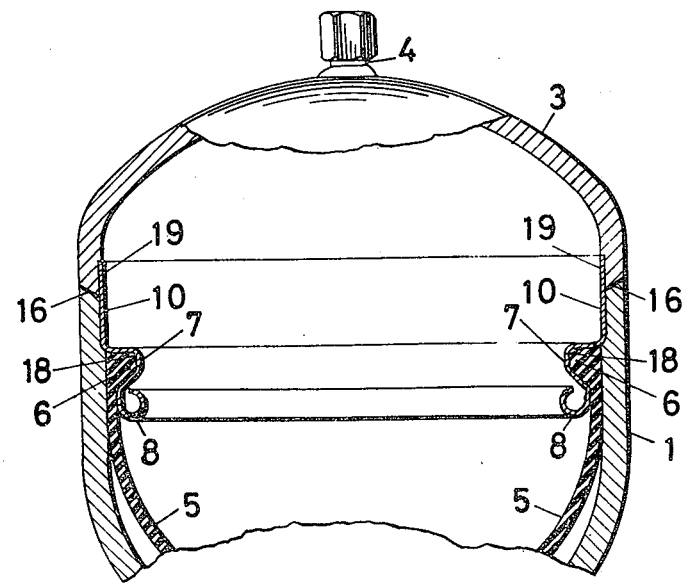

As shown in FIG. 1, the curl edge 8 formed at the lower portion of the bladder holding ring 7 may be extended upward to form a reinforcing piece 15 and by bonding its tip to the back side of the guide ring 10, the bladder holding ring 7 is more reinforced enabling to hold the flange 6 more tightly and further, as the back plate is doubled when welding is made, effect of back plate is more increased. Of course, this reinforcing piece 15 may be dispensed with as shown in FIGS. 2, 3 and 4.

In assembling this accumulator, first the upper portion of the guide ring 10 formed on the upper portion of the bladder hold ring 7 is let engaged in the lower inside circumference of the lid 3 and said tip portion is welded to the lid 3 so that the bladder holding ring 7 depends downward from the lid 3. With this state, to the outside of the lower portion of bladder holding ring 7, the opening portion of the gas bladder is let engaged, that is, the lid 3 is put on the main body 1 with the flange 6 engaged in the recessed portion 18 of bladder holding ring 7 thus the outer circumference of the resilient bladder body 5 held by the bladder holding ring 7 is closed to the inner wall face of the main body 1 so as to be snugly fit. In this instance, by providing a slight taper to the inner 6 wall face of the main body 1, when the flange 6 of the resilient bladder body 5 is getting engaged in said recess, it is more pressed inwardly by virtue of the taper and securely tightened in the bladder holding ring 7. Then the sealing portion formed by a part of the guide ring 10 comes to engage in the main body so that the lid body 3 is exactly aligned to the main body 1. Under this status, the ends of the container 1 and lid 3, as seen in FIGS. 1 and 4 – 6, the respective bevelled faces 14 and 16 are closed together and these portions are electron-beam welded. Or as seen in FIGS. 2 and 3, these portions are electrically or gas welded at the formed welding groove 17. In either instance, the guide ring 10 integrally formed with the bladder holding ring 7 acts as a back plate in effecting welding. In welding the main body 1 and lid 3, as the bladder holding ring 7 is bonded thereto, an accumulator is very easily assembled with the bladder exactly held in a predetermined position. Yet in this instance, as the guide ring 10 is placed at the inside of the welded portion, it bars weld residues or the like which otherwise will get in the container to result in damage to the resilient bladder, thus it enables easy welding of the joint portions of the main body 1 and lid 3. Also in this welding, as the bladder holding ring 7 is welded together, the flange 6 is more tightly supported by the bladder holding ring 7.

Further, since this accumulator is such that the flange 6 is interposed between the bladder holding ring 7 having guide ring 10 attached to the lid body 3 and the inner wall of the container main body 1, its construction is very simple. Moreover the mounting of the resilient bladder 5 to the container main 1 is performed only by putting the lid body 3 on the main body 1 its assembling is practically very easy.

In FIGS. 2, 3, 4, 5 and 6, same numerals of parts in FIG. 1 indicate like parts. As to that shown in FIG. 2, the reinforcing member in FIG. 1 is omitted and differs from that in FIG. 1 in that gas welding or electric welding is made in the welding groove 17. As to that shown in FIG. 3 it differs from that in FIG. 2 in that the upper end portion of the guide ring 10 has a curved face 20. As for that shown in FIG. 4, it differs from that in FIG. 1 in that the guide ring 10 is inserted in a recess 19 of the lid body 3 and the reinforcing piece 15 is dispensed with.

Figure 5:
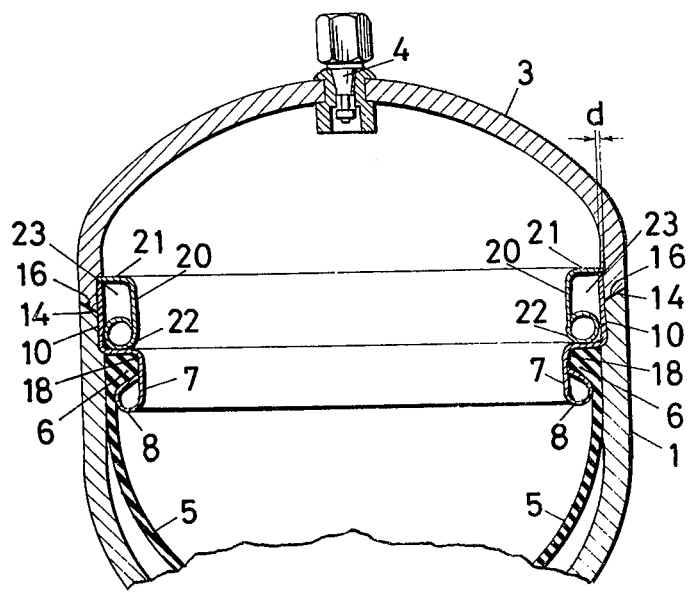
Figure 6:
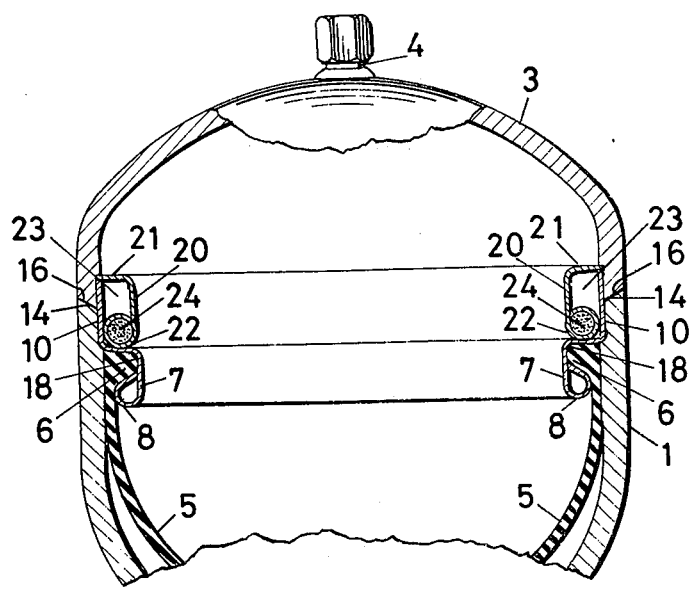

In FIGS. 5 and 6, same numerals of the parts in FIG. 1 will indicate the same parts.

Further in FIGS. 5 and 6, 20 is an auxiliary ring. 21 is a flange formed on the upper part of it. 22 is a curl portion of its lower part. 23 is an opening surrounded by the auxiliary ring 20.

The outer circumference of the flange 21 is engaged in a recess 19 of the lid and to this portion of the flange 21, the upper end of the guide ring 10 abuts. If the depth $d$ of this recess 19 is not deep enough for the sake of the strength of the lid body 3, the upper end of the guide ring 10 will not get away from the recess 19. Otherwise the whole of the bladder holding ring 7 gets loose and this spoils the sealing of the flange portion 6 of the bladder 5.

Further when the bevelled faces 14, 16 are welded with electron beam, if with an error, electron beam penetrates into the guide ring 10 giving a bore and further into the main body 1, the curl portion 22 of the auxiliary ring 20 will prevent it from its entering and welding residues are retained in the opening 23.

As for that shown in FIG. 6, the curled portion 22 is filled with an earthen ware 24 so that the electron beam is assuredly barred and therefore any electron beam and welding residue are more assuredly prevented from entering in the bladder.

What is claimed is:
1. An accumulator consisting of a pressure container for liquid and an interior housed bladder for pressurized gas on one side opposite said liquid, comprising:
    a pressure container combined of an upper lid body and a lower main body, said bodies each being generally cup-shaped with an end faced to mate with the other body end for welding the bodies together at such faces to form said container,
    a bladder holding ring having in series positioned relation top to bottom, a cylindrical guide ring portion, a circular bladder flange holding recess portion and a circular curl portion, said guide ring portion snugly fitting against the interior of said lid body and extending past the lid body welding face, the outer surface of the guide ring having a cylindrical surface concentric with and extending past the lid body welding face in continuation of the interior surface of said lid body, said bladder holding recess being annularly about said ring in the portion so extending past the lid body welding face and positioned to receive a flange on the bladder, said curl portion being on the extremity of said ring beyond the recess and having a curved surface for supporting the blade smoothly when laying thereover,
    said main body end having an interior surface tapered to force the housed bladder flange into said recess when said welding faces are together, said guide ring guiding said cup-shaped lid and body, and backing said welding faces while holding said bladder properly housed and an auxiliary ring inside the guide ring portion and having a body portion extending upwardly from the bladder flange holding recess portion in inwardly spaced relation to the guide ring portion forming a hollow annular space between the guide and auxiliary ring portions opposite the welding faces of said accumulator lid and main bodies to trap any weld material entering the container at the weld faces.
2. An accumulator as specified in claim 1 including an earthenware material in at least a portion of said hollow annular space in alignment with the weld faces of said lid and main bodies to intercept any such weld material.

* * * * *